United States Patent [19]
Burroughs

[11] 3,734,541
[45] May 22, 1973

[54] AIR ACTUATED TRUCK-TRAILER HITCH

[76] Inventor: Elvin O. Burroughs, Route 2, Box 207, Dexter, Oreg. 97431

[22] Filed: Aug. 16, 1971

[21] Appl. No.: 171,861

[52] U.S. Cl................................280/506, 280/404
[51] Int. Cl. ...............................................B60d 7/00
[58] Field of Search.......................280/506, 504, 434

[56] References Cited

UNITED STATES PATENTS 2,522,791   9/1950   Ketel....................................280/506
2,399,364   4/1946   Lewison...............................280/504

*Primary Examiner*—Leo Friaglia
*Assistant Examiner*—Robert R. Song
*Attorney*—James D. Givnan, Jr.

[57] ABSTRACT

A hitch for a truck and trailer with the locking member of the hitch adapted for opening and closing of the hitch by travel along a horizontal, rectilinear path. The locking member is moved to a closed position by an air pressurized booster unit. Movement is imparted to the locking member via a booster actuated assembly which additionally functions to move a pressure block of the hitch into engagement with the eye member carried by the trailer. The eye is thereby restrained against undesired movement while in engagement with the post of the hitch. Adjustable means enable the pressure block-eye engagement to be set to achieve the aforementioned result while avoiding restricting rotational movement of the eye. A mechanical lock automatically locks the locking member in a closed position.

8 Claims, 5 Drawing Figures

INVENTOR
ELVIN O. BURROUGHS

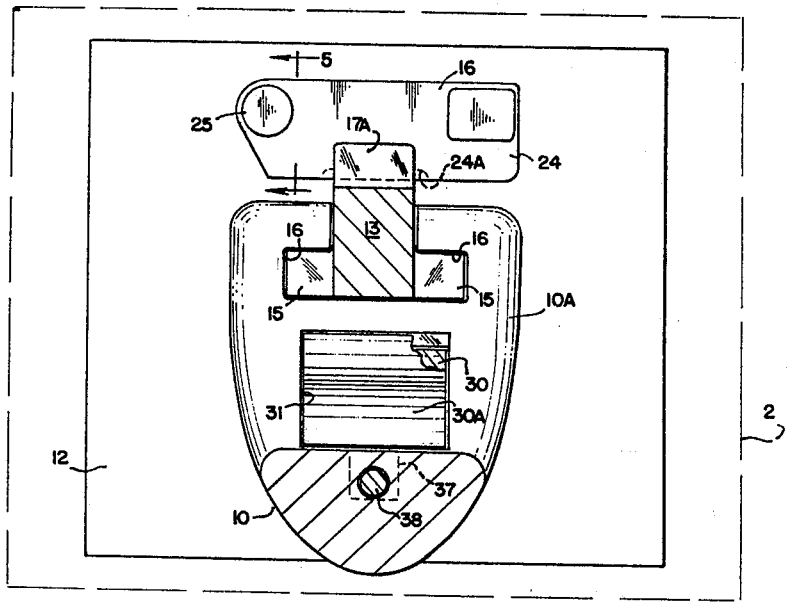
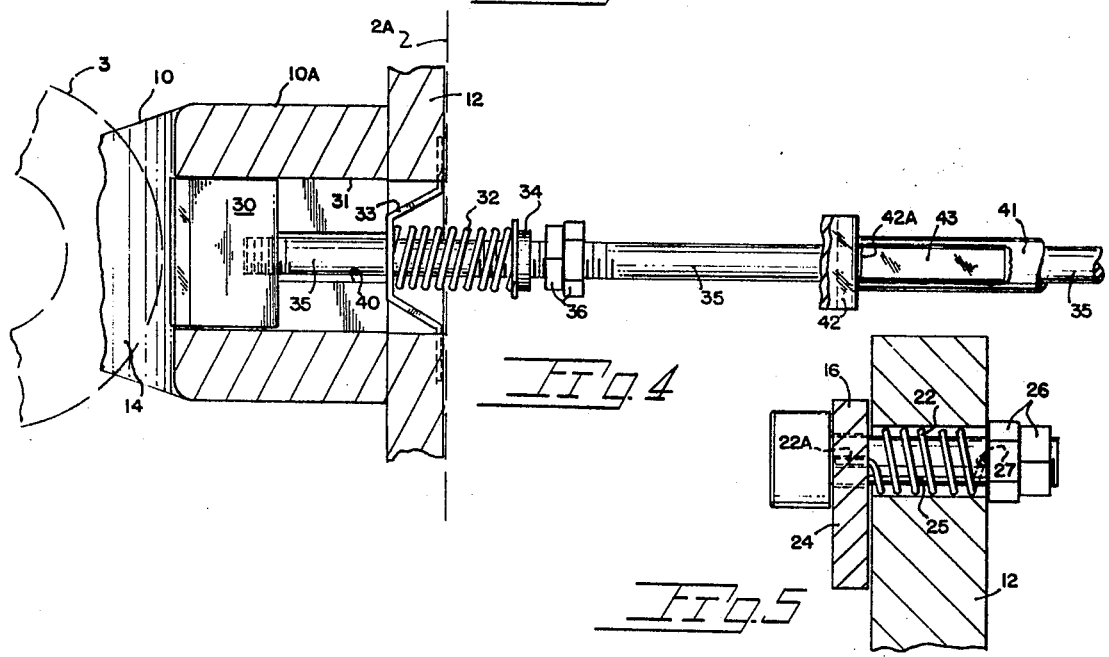

AIR ACTUATED TRUCK-TRAILER HITCH

BACKGROUND OF THE INVENTION

The present invention concerns a hitch structure for use in coupling a truck and trailer.

In common use, within the trucking industry, are hitch structures wherein the movable locking member opens and closes with movement through an upright arc. A hitch eye on the trailer is downwardly engageable about the upright post of the hitch with the locking member overlying the eye and post in a locked position. Preparatory to a coupling, the locking member of such conventional hitches is swung upwardly to an open, near vertical position whereat it is subsequently contacted, usually forcefully, by the trailer eye. Such impacting of the raised locking member undesirably results in the deforming or "dishing" of the underside of the member and secondly causes severe loading of the latching surfaces with resultant deforming and wear thereof. Repeated forceful contacts between the trailer eye and the hitch ultimately result in a deformed locking member which does not closely confine the trailer eye resulting in excess play between same during travel.

Where truck-trailer couplings are made several times a day as in a log trucking operation the hitch is subjected to severe wear. Further, metal fatigue of the locking member with sudden failure is not uncommon in the log trucking industry with truck-trailer separation causing the log load to be lost with serious risk of injury or death to the truck operator and other motorists.

The gradual wearing of latching surfaces both on the locking member and its associated latching components permits the locking member, in the above mentioned type of hitch, to move upwardly from the post while in a locked condition. The trailer eye, being of circular section, exerts a wedging action which action becomes progressively greater as the clearance between the post end and the locking member increases.

The foregoing applies both to manual and air actuated truck hinges of the type hitch having a locking member positionable within an upright plane. Such hitches are in common use throughout the log trucking industry where the problem of hitch wear is accentuated by reason of the several truck-trailer couplings each working day. It is standard practice after unloading of a log truck and trailer, to uncouple and load the trailer on the truck for the return trip to the log loading site. The coupling of truck and trailer at said site, prior to loading, is usually done in a rapid manner often with substantial impacts being imparted to the hitch structure.

Additional to the aforementioned problem with existing hitches is that of inhibiting rotational movement of the trailer carried eye. Desirably the trailer eye, when coupled, should be capable of unrestricted horizontal rotational movement about the post member of the hitch. While attempts may be made to standardize hitch components to effect a uniform fit between the trailer eye and the hitch an optimum fit exists only when wear is not a factor. Accordingly, practically speaking the desired fit is of short duration relative to the life of the hitch. Ideally the trailer carried eye should engage the hitch without relative horizontal motion occuring therebetween while oppositely a snug or binding fit is to be avoided as it can impair the "trailing" characteristics of the trailer.

SUMMARY OF THE PRESENT INVENTION

The present hitch while described in connection with use on log trucks and trailers is equally practical for other trucking uses. The hitch includes a retractable locking member which is biased to a closed position whereat it automatically and mechanically locks. The hitch includes a pressure block which adjustably engages the eye of the trailer to exert a desired force against same preventing relative movement between the hitch and the eye while avoiding pivotal restriction of the eye. The pressure block additionally serves to retain the eye downward in a seated position in the hitch. A booster actuated member adjustably engages a rod housed therein permitting variable loading of the pressure block. Limit stop means additionally determine the forward travel of said pressure block.

An important object of the present invention is to provide a truck-trailer hitch not susceptible to damage during a coupling operation. Toward this end a locking member is provided which is retractable away from the hitch post when opened and shaped at its forward end so as to be not susceptible to damaging impact with the trailer eye. The trailer eye is closely confined by the locking member which slides horizontally forward during closing to overly the eye. The pressure block so provided for biasing the eye is automatically retracted upon opening of the hitch so as to not interfere with eye-post engagement.

A further important object of the invention is to provide a hitch remotely operable to a closed position whereat the locking member is retained by a latch insertable between said member and the base of the hitch. Upon the locking member being moved to a closed position by the booster mechanical latching occurs with the closed position of the hitch not being reliant upon the booster and hence not affected by booster or air system failure.

BRIEF DESCRIPTION OF THE DRAWINGS

In the accompanying drawings:

FIG. 3 is a vertical, elevational view of the hitch taken along line 3—3 of FIG. 2, FIG. 4 is a horizontal, sectional view taken downwardly along line 4—4 of FIG. 2 showing details of the pressure block and linkage therefor, and FIG. 5 is a sectional view of the latch structure taken along line 5—5 of FIG. 3.

DESCRIPTION OF THE PREFERRED EMBODIMENT

Figure 1:
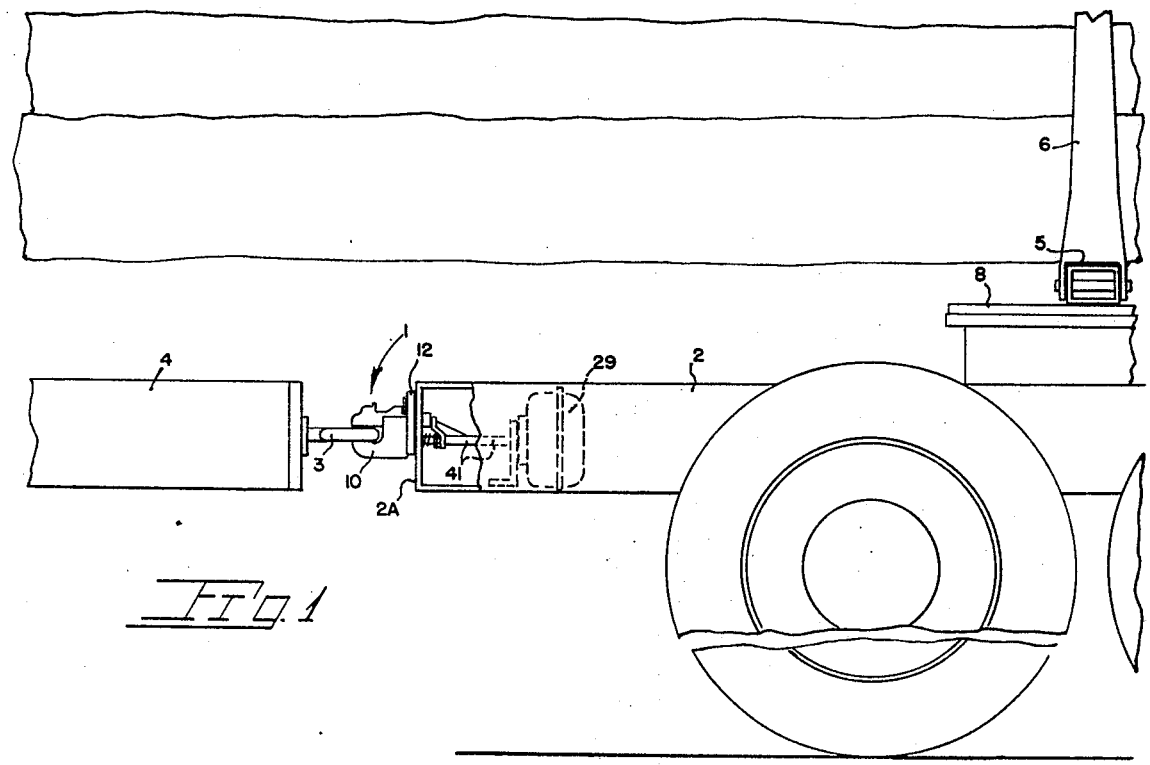
FIG. 1 is a side elevational view of the rearward end of a log truck chassis fitted with the present hitch for towing of a trailer.

With continuing attention to the accompanying drawings wherein reference numerals are applied to parts similarly identified in the following specification the reference numeral 1 indicates generally the present hitch structure embodying the invention. The hitch 1 is shown permanently affixed to the rearward end of a log truck chassis 2 and in engagement with an eye 3 permanently mounted at the forward end of a log truck trailer reach 4. Other truck applications for the hitch, beyond the present log truck use, will become readily apparent.

The log truck trailer, of which the reach 4 constitutes the main longitudinal member, additionally comprises a set of wheel trucks along with log supporting bunk stakes and bunks all of which do not constitute part of the present invention. The log load is supported adjacent its forward end by a log bunk 5 and a pair of bunk stakes as at 6 swingably mounted upon a turntable 8 on the truck chassis 2. It is conventional practice, subsequent to unloading of the logs, to uncouple the eye 3 to permit loading of the log truck trailer onto the truck chassis 2 for the sake of convenience and safety of the return trip to the log loading site. It is not uncommon that a coupling operation will be performed five or six times in a day depending, of course, on the number of trips made. Hence a requirement exists for a hitch not susceptible to damage during repeated couplings.

Figure 2:
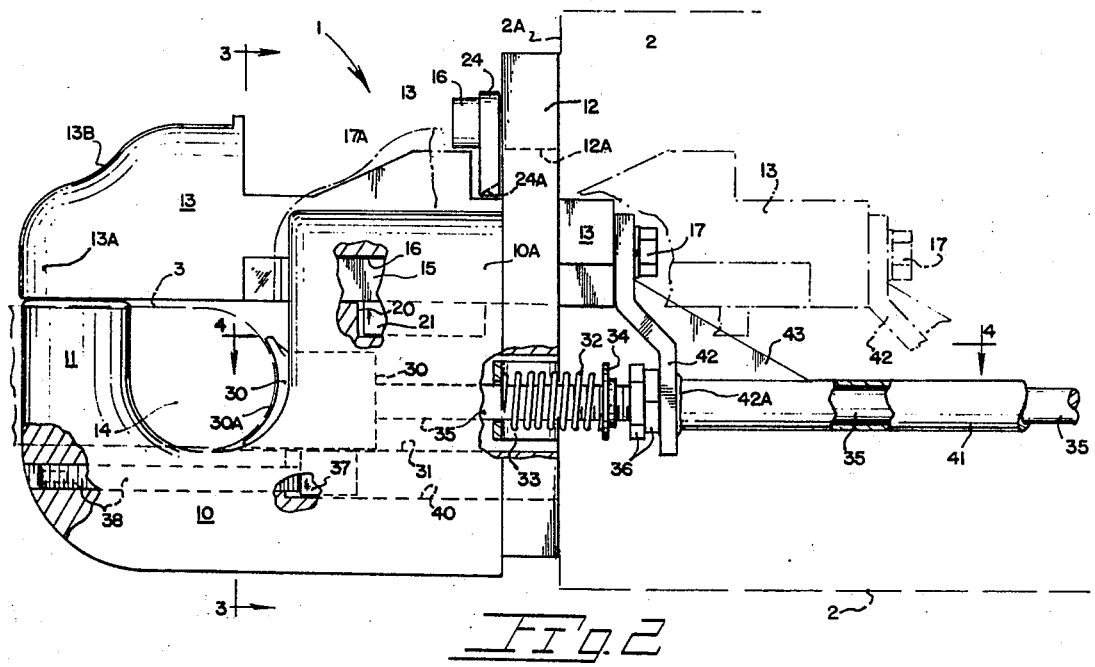
FIG. 2 is a side elevational view of the hitch structure with fragments broken away and with the open position of the locking member shown in broken lines.

A main body 10 of the hitch may be of cast construction terminating rearwardly, with respect to the truck chassis, in an upright post 11. The main body has an enlarged portion indicated at 10A which is integral with a mounting plate 12 the latter for securement to a rear face 2A of chassis 2. Indicated at 13 is a slidably carried locking member adapted for fore and aft opening and closing movement relative to an eye receiving recessed area 14 of the hitch. As best seen in FIGS. 2 and 3, locking member 13 is provided with a pair of outwardly projecting guides 15 each of which is slidably received within correspondingly shaped guideways 16 extending through the main body 10. The outer end of locking member 13 is rounded at 13A which merges upwardly with a curved surface 13B both of which serve to harmlessly deflect the trailer eye during coupling. Locking member 13 is retained against opening movement by means of a latch assembly 16 engaging a lug 17 projecting upwardly from the locking member. The locking member extends through an opening 12A in the mounting plate 12 and through an opening in the end wall 2A of the trailer chassis. Secured as at 17 to the inner end of locking member 13 is the end of the booster actuated assembly, later described, for closing of the locking member. Such closing movement of locking member 13 is limited by a stop 20 contactable by a downward projection 21 on said member.

Latch assembly 16 is adapted for biased downward movement by action of a helical spring 22 (FIG. 5). A beveled surface 23A on the latch 24 is engageable with an inclined surface 17A of lug 17 whereby closing movement of the locking member automatically displaces latch member 24 upwardly. The latch 24 is accordingly biased downwardly, after lug passage, into locking engagement intermediate lug 17 and the base 12. A pivot pin 25 extends through base 12 to receive a pair of lock nuts 26 while the opposite end of the pin pivotally supports the latch 24. One end of spring member 22 terminates in engagement with the latch with the opposite spring end being held stationary by inserted engagement into an aperture 27 in base 12.

A pressure block at 30 for contact with trailer eye 3 is slidably carried within the enlarged portion 10A of the base within an opening 31 extending lengthwise thereof. As viewed in FIG. 2 the forward terminus of the pressure block has a concave surface 30A extending both above and below a horizontal plane located medially of the trailer eye 3. Forward positioning of block 30 confines the trailer eye in downward seated engagement about post 11 and against both vertical and horizontal linear motion. A helical compression spring 32 acting on an actuator bar 35 serves to retract or open pressure block 30 in the absence of air pressure within a booster indicated at 29. A spring retainer 33 in the form of an angular plate holds one end of the spring while oppositely the moving end of the spring bears against an internally threaded disc 34 on actuator bar 35. Additionally carried by bar 35 in an adjustable manner are a pair of nut elements 36, the nut elements and bar 35 constituting motion translation means for imparting movement to pressure block 30 urging same in trailer eye contact.

Carried by said block is a lug 37 for limit stop abutment with the end of threaded stud 38 extending centrally of the body 10. The outer end 38A of stud 38 defines a socket permitting an adjustment tool to be inserted for precise adjustment of the force exerted on the trailer eye by the pressure block under static conditions. The lug 37 travels in a channel 40 which channel is in communication with opening 31 to permit removal of block 30 should same become necessary.

A booster actuated assembly comprises, initially, a tubular member 41 in operative engagement with the pressure responsive diaphragm of the booster 29. The tubular member 41 is adapted for rearward (relative to the truck chassis), linear extension upon pressurization of the booster 29 while conversely venting of booster air pressure causes the booster to retract member 41 to the right as shown in FIGS. 1, 2 and 4. That end of member 41 adjacent the hitch body 10 is provided with an upright plate 42 as by welding at 42A, with the plate terminating upwardly in securement at 17 with the locking member 13 as earlier described. A gusset at 43, also in welded attachment to plate 42, reinforces the latter against applied loads. Locking member 13 is accordingly movable rearwardly into a locking position over post 11 by reason of the booster actuated assembly above described transmitting motion from the movable diaphragm within the pressurized booster 29. The booster 29 may be considered conventional and as of the type most commonly used in air brake systems.

During opening movement of the hitch the booster actuated member 41 is moved to its retracted position with plate 42 moved away from engagement with the nut elements 36 on actuator bar 35. Bar 35, under the influence of spring 32, will also move in the same linear direction but to a lesser degree. Bar 35, during such movement, acts as a bearing surface for the circumposed tubular member 41. Movement of bar 35 will result solely from the action of compression spring 32. Only limited movement of the bar 35 is necessary to accomplish the retraction of pressure block 30 out of recess area 14. Substantially greater linear travel of member 41 is required to retract locking member 13 to the open position shown in broken lines in FIG. 2. The travel required of member 41 is within the capability of a conventional booster unit.

Oppositely in closing of the hitch the application of truck air system pressure to booster 29 will cause tubular member 41 of the booster actuated assembly to commence closing movement of locking member 13 via the booster actuated assembly with the plate 42 on said member traveling into abutment against adjustable nut elements 36 to commence compression of spring 32 and simultaneously causing pressure block 30 to move towards contact with the inserted trailer eye 3. The extent of such movement of pressure block 30 and the degree of pressure exerted on the trailer eye 3 may be set by adjustment of stud 38 carried within the main portion 10 of the hitch. Accordingly movement of bar 35 as urged by tubular member 41 as just described will carry pressure block 30 into adjusted engagement with the trailer eye 3. Since the adjustment of the pressure block by a stud 38 imparts only limited movement to the block 30 the closed position of locking member 13 is, for all practical purposes, unaffected.

During the forward travel of locking member 13, the inclined surface 17A thereon acts in the nature of a cam to swing latch assembly 16 momentarily upward with subsequent latch movement being downward to the solid line latching position of FIG. 2. To unlock the hitch, the truck operator initially vents booster 29 with subsequent manual movement of latch member 16 permitting the locking member 13 to be manually opened. As uncoupling of a log truck and trailer takes place only after a log load has been discharged no risks are encountered in this uncoupling operation.

The locking of the hitch may be accomplished automatically upon pressurization of booster 29 with latch assembly 16 moving into place, as above described, upon the locking member reaching its forward locking position.

With the trailer eye in place on the hitch and the booster acting via tubular member 41 and actuator bar 35 to bias the pressure block into eye engagement the hitch may be adjusted at intervals to attain the optimum bearing contact of the block on the eye. Some horizontal movement of the trailer eye and pressure block will occur during road travel of the truck and trailer however such travel is slight as the trailer eye is stopped by abutment with the hitch body 10.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A hitch structure for coupling a truck and trailer and comprising,
    a main hitch body including a post member and defining a recessed area for the reception of a trailer carried eye,
    a locking member slidably carried by said body and adapted for rectilinear movement into open and closed positions relative to said post,
    a latch assembly retaining said locking member in a closed position over said post,
    a pressure block also slidably carried within said main body adapted for movement toward and away from the recessed area of the hitch body and in biased contact with the trailer eye when in place about said post,
    a booster actuated assembly for imparting opening and closing movement to the locking member and additionally biasing said pressure block into trailer eye engagement, and
    actuator bar means associated with said pressure block and responsive to partial closing movement of said booster actuated assembly for translating partial closing movement of said assembly into movement of said pressure block whereby upon closing movement of said booster actuated assembly with resultant closing of said locking member the pressure block will be moved into biased contact with the trailer eye to retain same against undesired movement.

2. A hitch structure as claimed in claim 1 additionally including adjustment means housed within the main hitch body, said adjustment means engageable with said pressure block and operable to urge the pressure block in a direction opposite to said translating means imparted movement to permit varying of the pressure block load on the trailer eye.

3. A hitch structure as claimed in claim 1 wherein adjustable elements are associated with said actuator bar for engagement by said booster actuated assembly whereby the extent of travel of the pressure block may be varied.

4. A hitch structure as claimed in claim 3 wherein said actuator bar and said pressure block are integral and spring biased to a retracted position away from the trailer eye when said locking member is in an open position.

5. A hitch structure as claimed in claim 4 additionally including adjustment means housed within the main hitch body, said adjustment means engageable with said pressure block and operable to urge the pressure block in a direction opposite to said translating means imparted movement to permit varying of the pressure block load on the trailer eye.

6. A hitch structure as claimed in claim 3 wherein said booster actuated assembly includes a tubular member operable by the booster, said actuator bar and said tubular member being in a lost motion working relationship.

7. A hitch structure as claimed in claim 6 wherein said tubular member telescopically receives said actuator bar with said adjustable elements being carried by the latter.

8. A hitch structure as claimed in claim 1 wherein said locking member has an inclined surface thereon, said latch assembly includes means biasing same into engagement with said locking member, said inclined surface being engageable with said latch assembly during closing movement of the locking member to momentarily release the latch assembly.

* * * * *